Sept. 21, 1926.  C. G. OLSON ET AL  1,600,241

LOCK WASHER AND METHOD OF PRODUCING SAME

Filed Feb. 20, 1925

Inventors:
Carl G. Olson and
Joseph R. Richer,
by Cheever & Cox  Attys.

Patented Sept. 21, 1926.

1,600,241

UNITED STATES PATENT OFFICE.

CARL G. OLSON AND JOSEPH R. RICHER, OF CHICAGO, ILLINOIS, ASSIGNORS TO ILLINOIS TOOL WORKS, OF CHICAGO, ILLINOIS, A CORPORATION OF ILLINOIS.

LOCK WASHER AND METHOD OF PRODUCING SAME.

Application filed February 20, 1925. Serial No. 10,487.

Our invention relates to lock washers of the type in which the washer has radial prongs which are warped or twisted to a certain extent to hold the nut, bolt or screw against undesired rotation. Our washer is frusto-conical and the prongs or teeth extend radially inward from the body of the washer. This is in contrast with the washer shown in the copending application of Richard T. Hosking filed July 16, 1923, Serial No. 651,797, where the teeth or prongs project radially outward. The object of our invention is to conserve metal and to enable a disc of given diameter to accommodate a larger bolt or screw than has heretofore been possible. It will be understood that devices of this class are used in large quantities and that a saving of metal is, in the aggregate, a very important item. We have devised a method by which the waste of material is reduced to a minimum.

We accomplish our object in the manner illustrated in the accompanying drawings in which—

Like numerals denote like parts throughout the several views.

According to our method we first produce a blank in the form a disc 1 whose outer diameter is the full diameter of the finished washer and which has a central aperture 2 which is smaller than the inner diameter of the finished article. The blank is then slotted by cuts 4 which extend radially outward from the center aperture to a point near but not entirely to the outer diameter. Enough continuous metal is left at the rim to form a band or base from which the prongs may radiate.

Figure 1:
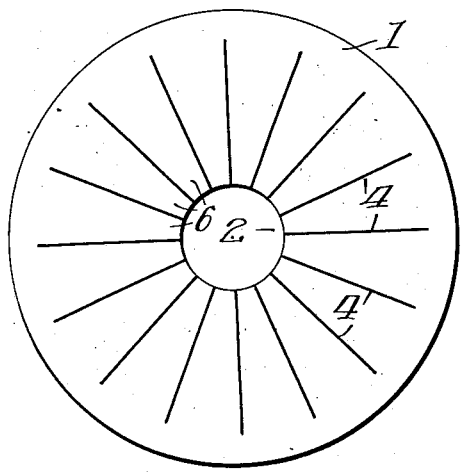
Figure 1 is a face view of a blank which has been slotted preparatory to final configuration.
Figure 2:
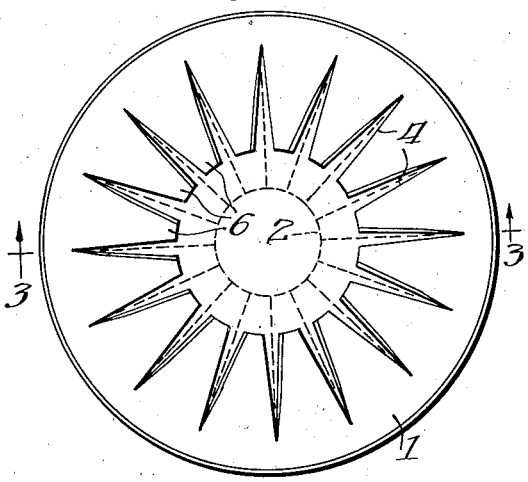
Figure 2 is a face view of the completed washer, the dotted lines showing the relationship between the finished washer and the slotted blank of Figure 1.
Figure 3:
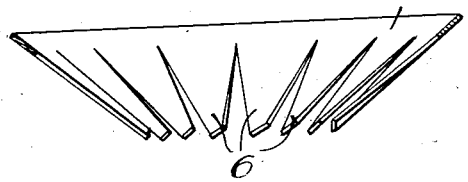
Figure 3 is a diametral section of the finished washer.
Figure 4:
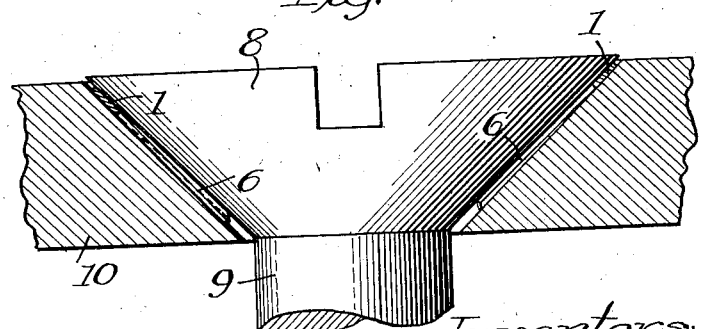
Figure 4 is an assembly view illustrating one manner in which the washer may be applied.

After the blank has thus been slotted it is pressed into conical form as shown in Figures 2, 3 and 4. At the same time or as a separate operation, as may be desired, the resulting prongs 6 are warped or twisted so that the inner ends shall be oblique in the manner best shown in Figure 3. This act or acts of configuration results in expanding the blank so that the center aperture instead of being of the diameter shown in Figure 1 is of the diameter shown in Figures 2 and 3.

In Figure 4 we have illustrated the manner in which the washer may be used. In this case a screw having a frusto-conical head 8 and a shank 9 is held in a countersunk plate 10. The washer seats within the countersunk opening and the head of the screw seats within the washer. When the screw is drawn tight the prongs present their corners to the contacting elements and prevent accidental rotation of the parts in a direction to loosen the screw.

It will be observed that the central aperture 2 of the flat blank shown in Figure 1 would be insufficient to accommodate the shank 9 of the screw but that the configurating of the washer increases the size of the aperture and thus enables the washer to accommodate itself to screws or bolts of considerably larger size than could be accommodated if the blank remained flat. The metal punched from the center of the blank usually represents waste material or scrap, and it will be evident that as a result of our invention the waste is reduced to a minimum and the metal used very efficiently. Not only is the waste at the center of the blank minimized but we avoid cutting away any material to form the radiating prongs, as is done in producing the washer shown in the aforesaid Hosking application or in the earlier Hosking patent 1,419,564. As previously stated, it is immaterial whether the various steps occur successively or simultaneously, this depending upon the form of die used.

We do not claim anything shown in said Hosking application.

What we do claim as new and desire to secure by Letters Patent is:—

1. The method of producing conical lock washers consisting in producing a blank having a central aperture smaller than the diameter of the bolt or screw to be held, producing slits in the blank extending radially from the center part way to the circumference at spaced intervals, pressing the slitted blank to frusto-conical form to thereby expand the central aperture and separate the prongs lying between the slits, and slightly twisting the prongs.

2. A conical lock washer having prongs extending obliquely downward and radially inward and the individual prongs being twisted to present their corners to the elements which they are to lock, the prongs when viewed along the axis of the washer being angularly separated and the aggregate area of the prongs being equal to the area of a flat blank in which the prongs lie edge to edge and the central opening is of smaller diameter than the central opening of the finished washer.

In witness whereof, we have hereunto subscribed our names.

CARL G. OLSON.
JOSEPH R. RICHER.